(12) United States Patent
Dasbach et al.

(10) Patent No.: US 9,187,302 B2
(45) Date of Patent: Nov. 17, 2015

(54) RELEASABLE PRY BAR

(76) Inventors: Gerald L. Dasbach, Spring, TX (US);
Will Harris, Spring, TX (US)

( * ) Notice: Subject to any disclaimer, the term of this patent is extended or adjusted under 35 U.S.C. 154(b) by 897 days.

(21) Appl. No.: 13/439,033

(22) Filed: Apr. 4, 2012

(65) Prior Publication Data
US 2012/0192394 A1 Aug. 2, 2012

Related U.S. Application Data

(63) Continuation of application No. 12/559,323, filed on Sep. 14, 2009, now Pat. No. 8,240,017, which is a continuation of application No. 11/926,649, filed on Oct. 29, 2007, now Pat. No. 7,587,800.

(51) Int. Cl.
*B66F 15/00* (2006.01)
*B23K 37/04* (2006.01)
*B25B 11/00* (2006.01)

(52) U.S. Cl.
CPC ............ *B66F 15/00* (2013.01); *B23K 37/0408* (2013.01); *B25B 11/002* (2013.01); *Y10T 29/53896* (2015.01); *Y10T 29/53909* (2015.01); *Y10T 29/53983* (2015.01)

(58) Field of Classification Search
CPC ...... B25B 11/002; B25B 11/007; B25B 7/00; B23Q 11/0021; B23Q 11/0067; B23P 19/04
See application file for complete search history.

(56) References Cited

U.S. PATENT DOCUMENTS

| | | | |
|---|---|---|---|
| 1,371,484 A | 3/1921 | Howard | |
| 1,828,791 A | 10/1931 | Thompson | |
| 3,002,149 A | 9/1961 | Christian | |
| 4,263,553 A | 4/1981 | Cook et al. | |
| 4,300,754 A | 11/1981 | Lawrence | |
| 5,515,250 A | 5/1996 | Ortega | |
| 6,279,885 B1 | 8/2001 | Leon, Jr. | |
| 6,707,360 B2 | 3/2004 | Underwood et al. | |
| 6,819,109 B2 | 11/2004 | Sowers et al. | |
| 7,012,495 B2 | 3/2006 | Underwood et al. | |
| 7,310,060 B2 | 12/2007 | Stilwell et al. | |
| 7,587,800 B2 * | 9/2009 | Dasbach et al. | 29/267 |
| 8,240,017 B2 * | 8/2012 | Dasbach et al. | 29/267 |
| 2004/0239460 A1 | 12/2004 | Kocijan | |
| 2009/0108243 A1 | 4/2009 | Dasbach et al. | |
| 2010/0213424 A1 * | 8/2010 | Dasbach et al. | 254/131 |
| 2012/0192394 A1 * | 8/2012 | Dasbach et al. | 29/267 |

FOREIGN PATENT DOCUMENTS

| | | |
|---|---|---|
| JP | 53-44899 | 9/1951 |
| JP | 11347793 | 12/1999 |

* cited by examiner

*Primary Examiner* — Lee D Wilson
(74) *Attorney, Agent, or Firm* — Edmonds & Nolte, P.C.

(57) ABSTRACT

An apparatus for releasably attaching a pushing tool to one work piece such that a pushing force can be applied to a second work piece and allow alignment of the two work pieces for joining the work pieces together.

23 Claims, 3 Drawing Sheets

RELEASABLE PRY BAR

CROSS-REFERENCE TO RELATED APPLICATIONS

This is a continuation application of U.S. patent application Ser. No. 12/559,323, filed on Sep. 14, 2009, which is a continuation of U.S. patent application Ser. No. 11/926,649, filed on Oct. 29, 2007, which are both incorporated by reference herein.

BACKGROUND OF THE INVENTION

1. Field of the Invention

The present invention is a tool for releasably attaching to sheets of material and applying a prying or pushing force.

2. Description of the Related Art

In pressure-vessel and storage-tank construction, large sheets of metal must often be positioned relative to each other for joining. Typically this joining is accomplished by welding the sheets of metal together. To properly weld the sheets of metal, however, they must be in proper alignment with each other.

Two common methods of joining sheets of metal are lap-joints and butt-joints. A lap-joint is where the ends of metal sheets overlap each other. Then the edge of each sheet is welded to the face of the other sheet. A butt-joint is where the two sheets are aligned edge-to-edge. Once the edges are properly aligned, they are welded together. Both of these methods of joining metal sheets require the edge of one sheet to align with the face or edge of the other sheet.

These methods of joining materials are used on a variety of materials, not just metals. For example, large sheets of plastic, fiberglass, wood, or other materials can be joined together using lap-joints and butt-joints. These non-metallic materials can be joined by plastic welding, special adhesives, and other means well known in the art. To properly join large sheets of these materials, the edge of one sheet must again align with the face or edge of the other sheet.

However, the sheets of materials typically do not align properly with each other. Variations in the construction and properties of the sheets to be joined often keep the edge of one sheet from closely following the face or edge of the other sheet. Those variations can result in the edge of one sheet being too far from the face or edge of the other sheet for the two to be properly joined. Thus, the areas for the lap-joint or butt-joint must be brought into closer alignment before joining can be carried out.

When dealing with large sheets of metal or other materials, the need to align the sheets poses a problem. Because of the size of the sheets, clamps are impractical and often impossible to use. A common c-clamp or bar clamp, will not work on large sheets because the jaws of the clamp cannot extend the several feet needed to reach to the center of the sheet. Thus large sheets of material must often be aligned and joined using complicated and time consuming processes.

For example, large metal sheets are often aligned using blank nuts, key-plates and bull-pins. This process requires a blank nut, which is a square block with a hole through the center. Two blank nuts are aligned and welded to each sheet of metal on opposite sides of the anticipated weld-line. Then a key-plate, which is a specially designed tool, is placed over the blank nuts. The key-plate is held in place on the blank nuts by inserting a bull pin through each blank nut such that it passes through the key-plate and blank nut. Then additional bull-pins are inserted between the key-plate and blank nuts to adjust the metal sheets relative to each other. These adjustments are carried out by using the bull pins and key-plate to push or pull on the blank nuts as needed to adjust the metal sheets. Once the metal sheets are properly aligned, the aligned area is secured typically by welding. After one area is secured, the bull-pins are removed, and the key-plate is lifted off. Then the blank nuts are removed by cutting the welds that hold the blank nuts in place and grinding those welds off the metal sheets. This grinding occasionally requires an additional inspection of the metal sheets to ensure that the welding, cutting, and grinding around the blank nuts did not cause unacceptable damage to the metal sheets.

The above process must be carried out at every location that a joint is needed. That often requires the process to be repeated several times to complete a complete lap-joint or butt-joint.

This method for joining metal sheets has several drawbacks. For example, it is time consuming. It can take workers several hours to complete the process of welding blank nuts into place, installing the key-plate and bull pins, aligning the sheets, welding the sheets, and removing the bull pins, the key-plate, and blank nuts.

An additional limitation of the above method is that it can damage the surface of the metal sheets that are joined. This occurs because the blank nuts must be welded into place and then removed by cutting. This leaves portions of a weld that must often be ground down to smooth out the surface. In some situations, the removal of the blank nuts and their welds requires the surface of the metal sheets to be inspected and x-rayed to confirm that no structural damage was caused by the welding of the nuts.

Additionally, this method of joining metal sheets is expensive. This is because of the man-hours and the many different tools—a keyplate, blank nuts, bull pins, welders, cutters, and grinders—it requires. Further, the tools are often damaged and have to be replaced after a few uses. That is especially true of the blank nuts which are welded into place and then cut free from the metal surface.

The typical method is also difficult to adjust once the process is started. Because the blank nuts are the anchor points for the process and because they are welded into place, if the blank nuts are not placed in the right location the very first time, the whole process has to be undone and started over at the beginning. This only adds to the time and expense of using this method.

Similarly cumbersome methods exist for joining large sheets of non-metallic materials like plastics and wood. Joining these materials is often done by laying the sheets on a work surface, such a floor or table. Then a weight is applied to the upper sheet to force it down to the lower sheet. At the same time, one or more workers must physically maneuver the sheets to achieve the desired alignment. If the sheets are joined in a vertical arrangement, then some form of backstop must be constructed to allow workers on one side of the material to push against the sheet. A common practice to accomplish this type of joinder of non-metallic materials is to create special tools and jigs each time a material must be joined.

These common methods for joining large sheets of non-metallic materials have several drawbacks. The construction of special jigs to join such materials is expensive and time consuming. These methods typically require the efforts of several employees, making them man-power intensive.

SUMMARY OF THE INVENTION

In light of the disadvantages known in the prior art, one or more embodiments of the present invention addresses those disadvantages in novel and unique ways.

One embodiment of the present invention relies on a switchable magnetic device such as that described in U.S. Pat. Nos. 6,707,360 and 7,102,495 or alternatively such as an electromagnet. A handle is attached to the switchable magnetic device by a fork having a spine and two prongs. The handle and fork are constructed of materials such as aluminum or magnesium alloys, that are relatively unaffected by magnetic fields. The spine of the fork is affixed to one end of the handle and the prongs are rotatably mounted, using means that are well known in the art, to opposing sides of the switchable magnetic device, such that the handle and fork can rotate about the switchable magnetic device. When the switchable magnetic device is activated and attached to a sheet of metal that is highly susceptible to a magnetic field such as a ferrous metal, the switchable magnetic device acts as an anchor point about which the handle can rotate.

Additional embodiments of the present invention utilize a boss attached to the handle. The boss is affixed or rotatably mounted to the handle and oriented such that the boss faces the same direction as the bottom of the switchable magnetic device. In this way, when the switchable magnetic device is activated and applied to a sheet of metal that is highly susceptible to a magnetic field, the switchable magnetic device is anchored in place and the handle is rotated to allow the boss to contact a work piece and apply a pushing or prying force to it.

In further embodiments of the invention, the end of the boss that is opposite from the handle is specially shaped to cause the desired type of contact with the metal sheet being worked on.

An additional embodiment of the invention utilizes a means for releasably attaching to the top-face of a sheet of material that is not highly susceptible to a magnetic field such as a non-ferrous metal or plastic. Such means for releasably attaching can be a vacuum box. A handle is attached to a fork having a spine and two prongs. The spine of the fork is affixed to one end of the handle and the prongs are rotatably mounted, using means that are well known in the art, to opposing sides of the means for releasably attaching to the top-face of a sheet of material that is not highly susceptible to a magnetic field. The handle and fork can then rotate about the means for releasably attaching to the top-face of the sheet of material.

Additional embodiments of the present invention utilize a boss attached to the handle. One end of the boss is affixed or rotatably mounted to the handle and oriented such that the other end of the boss faces the same direction as the bottom of the means for releasably attaching to the top-face of a sheet of material that is not highly susceptible to a magnetic field. In this way and when the means for attaching to the top face of a flat work piece is activated, the handle can rotate to allow the boss to contact the work piece and perform work on it.

In further embodiments of the invention, the end of the boss that is opposite from the handle can be specially shaped to cause the desired type of contact with the metal sheet being worked on.

It is one object of the disclosed invention to provide a simple and convenient method for bringing sheets of material into alignment for joining.

It is an additional and alternative object of the present invention to provide a tool that can be quickly and easily attached to and removed from the sheets of material to be joined.

It is an additional and alternative object of the present invention to provide a tool that can be attached to and released from sheets of material without welding or the use of additional tools.

It is a further alternative objective of the present invention to provide a tool that does not affect the surface of the sheets of material to be joined, thus eliminating the need to inspect the sheets of material for damage or to grind the surface of those sheets of material.

Additional advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

DETAILED DESCRIPTION

Figure 1:
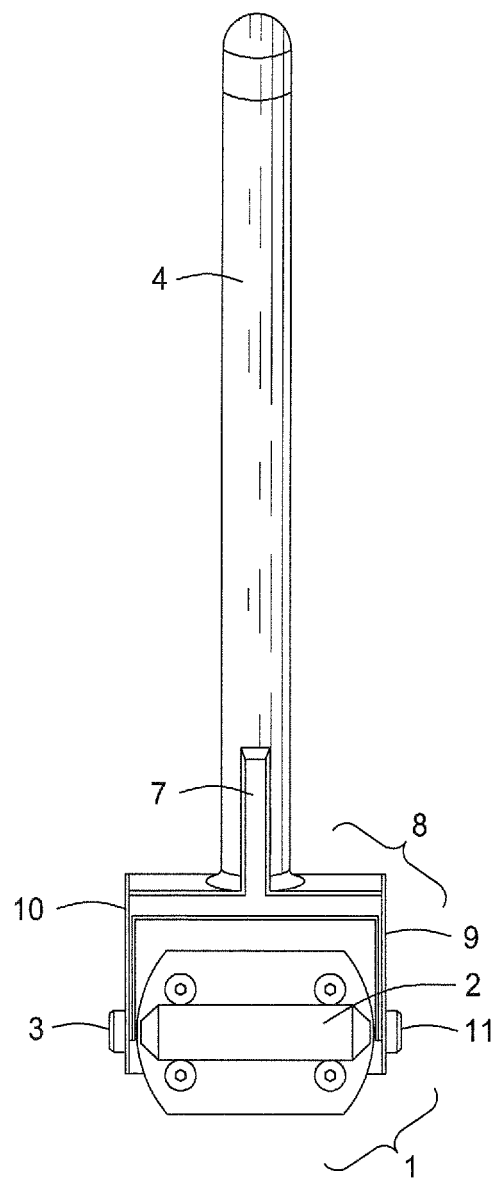
FIG. 1 is a perspective view of one embodiment of the present invention.
Figure 2:
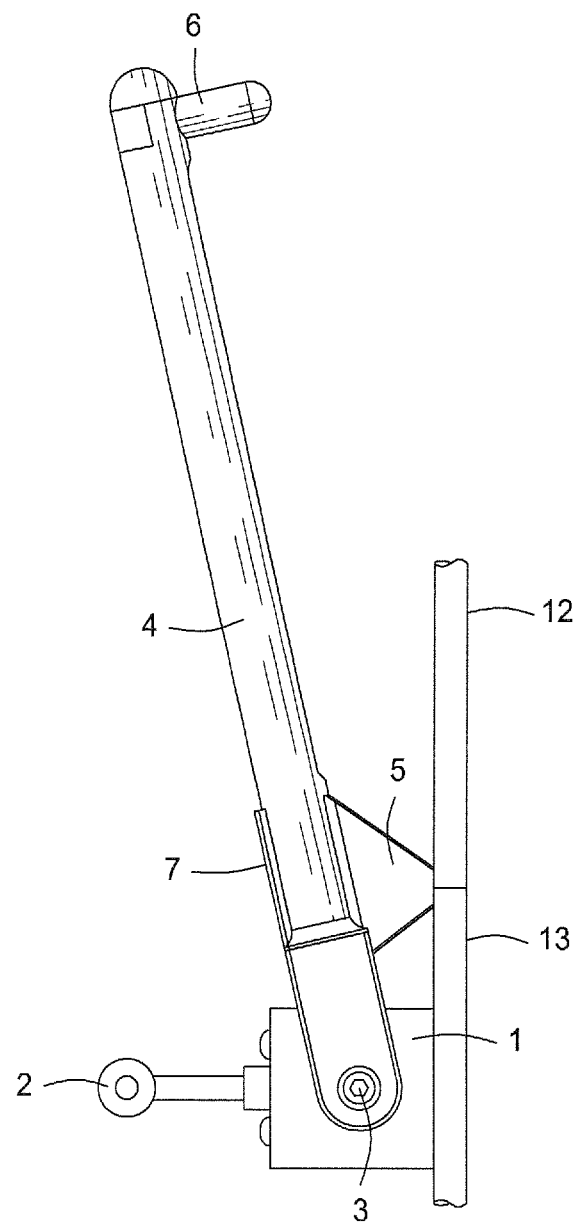
FIG. 2 is a top view of one embodiment of the present invention.
Figure 3:
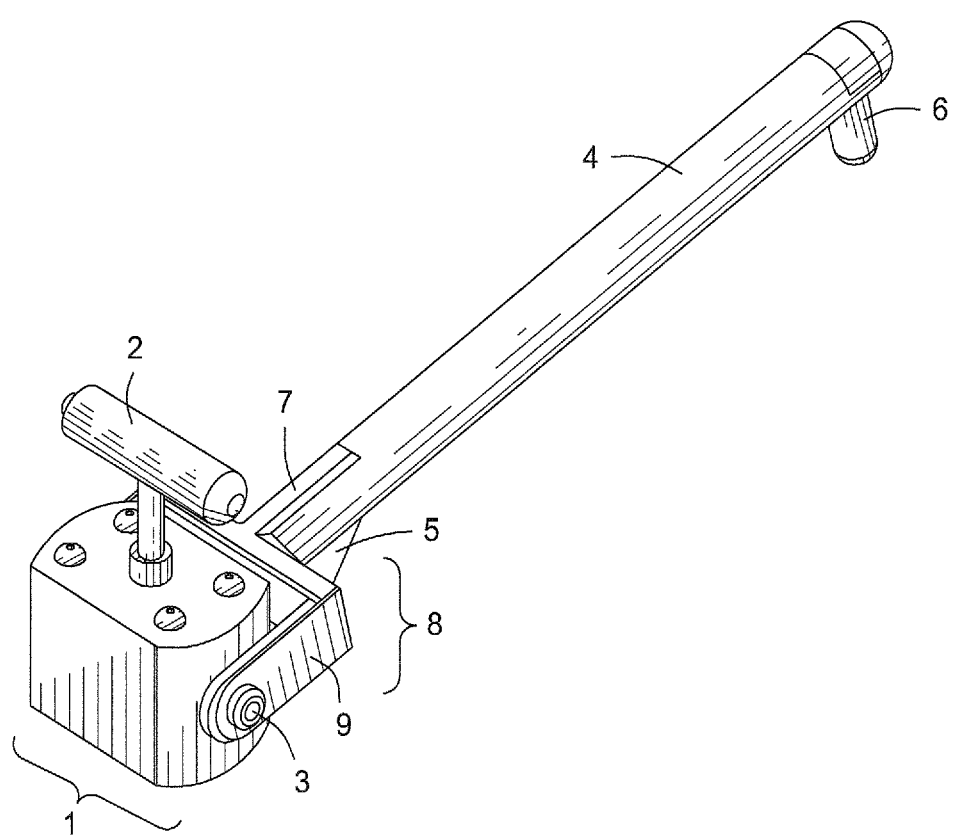
FIG. 3 is a side view of one embodiment of the present invention.

Referring now to the drawings, FIGS. 1, 2, and 3 show one embodiment of the present invention. In the illustrated embodiment, a switchable magnetic device 1 is used. The switchable magnetic device 1 is activated by rotation of a switch 2, such that when the switch 2 is in one position, a magnetic field is created along the bottom face, which is the face opposite the switch 2, of the switchable magnetic device 1. When the switch 2 is in the opposite position, almost virtually no magnetic field exists around the switchable magnetic device 1. In this way, the switchable magnetic device can be attached to materials that are highly susceptible to a magnetic field such as ferrous metals.

In the embodiment shown in the figures, a handle 4 and a fork 8 are attached to the switchable magnetic device 1. The handle 4 is comprised of an elongated shaft that is affixed at one end to the fork 8. The fork has two prongs 9 and 10 that each have holes near their terminal ends. The prongs 9 and 10 are rotatably mounted to the switchable magnetic device 1. In this embodiment, the handle 4 and fork 8 are made of a material that is relatively unaffected by a magnetic field, such as non-ferrous alloys like stainless steel, aluminum, or magnesium, or polymers, carbon fiber, or wood.

In the example shown in FIGS. 1, 2, and 3, the fork 8 is rotatably mounted to the switchable magnetic device by means of shoulder bolts 3 and 11. The shoulder bolts 3 and 11 pass through the holes in the prongs 9 and 10 and thread into the switchable magnetic device 1. The shoulder bolts 3 and 11 have a diameter that is slightly smaller than the holes in the prongs 9 and 10. The shoulder bolts 3 and 11 also have a non-threaded surface that rests within the holes in the prongs 9 and 10. The height of the shoulder bolts 3 and 11 is such that when they are fully threaded into the switchable magnetic device, the shoulder bolts 3 and 11 bottom out before binding against the prongs 9 and 10 of the fork 8. The difference in the diameter of the shoulder bolts 3 and 11 and the holes in the prongs 9 and 10 and the length of the shoulder bolts 3 and 11 permit the fork 8 and handle 4 to rotate freely about the shoulder bolts 3 and 11 and the switchable magnetic device 1.

It should be noted that many methods of rotatably attaching the fork 8 and handle 4 to the switchable magnetic device 1 are well-known in the art. For example, cylindrical studs could be press-fit into the switchable magnetic device 1.

These cylindrical studs would have slightly smaller diameters than the holes in the prongs 9 and 10 of the fork 8 to allow the fork 8 and handle 4 to rotate freely about the cylindrical studs. Alternatively, an arrangement of bushings or bearings could be mounted in the holes in the prongs 9 and 10 to achieve the same result.

In an additional embodiment, the prongs 9 and 10 could be rotatably mounted to a shroud, housing, or clamp that attaches to the switchable magnetic device 1.

In a further embodiment of the invention, a boss 5 is attached to the handle 4. The boss 5 has a first end and a second end. The first end of said boss 5 is aligned on and affixed to the handle 4, such that the second end of said boss 5 is oriented in the same direction as the bottom face of said switchable magnetic device 1. Thus, when the switchable magnetic device 1 is placed on a sheet of material that is highly susceptible to a magnetic field, such as a ferrous metal, and the switch 2 is activated, the switchable magnetic device is anchored to the sheet of material. Then the handle 4 can be rotated about the switchable magnetic device 1 to allow the second end of said boss 5 to contact and perform work on a work piece.

Referring now to FIG. 2, in this way the present invention can be used to align the edge of one piece of material to the edge of another. The switchable magnetic device 1 can be placed near the edges of the two work piece such that the switchable magnetic device 1 rests on and attaches to a first work piece 13 while the boss 5 is able to contact and act upon the second work piece 12. As the magnetic field of the switchable magnetic device 1 anchors itself to the first work piece 13, the handle 4 can be rotated so that the boss 5 contacts the second work piece 12 and the operator can transmit a pushing or prying force to the second work piece 12. When the pieces are in the desired alignment, the operator can quickly join the work pieces by welding. In FIG. 2, the present invention is shown creating a butt-joint between the first work piece 13 and the second work piece 12.

It should be noted that in the embodiment shown in the figures, the boss 5 is permanently affixed to the handle 4. This can be done by welding the boss 5 to the handle 4, by casting the boss 5 as part of the handle 4, by using adhesive to join the boss 5 to the handle 4, by press-fitting the boss 5 to the handle 4, or by many other means well known in the art for permanently joining two materials.

In additional embodiments of the invention, the boss 5 can be releasably mounted to the handle 4. Such means include bolting the boss 5 to the handle 4, using a key-way to slidably attach the boss 5 to the handle 4, and many other means well known in the art.

In additional embodiments of the present invention, the boss 5 can be rotatably mounted to the handle 4. This could include the use of tabs on the handle 4 and the boss 5, where a bolt, pin, bearings, bushings, or any other means that is well known in the art, passes through the tabs to rotatably join the boss 5 to the handle 4. In such an embodiment of the present invention, the boss 5 would be able to rotate independent of the handle 4.

It should further be noted that in the embodiment shown in FIGS. 1, 2, and 3, the second end of the boss 5 has a flat surface. In this embodiment, when the handle 4 is lowered the face on the second end of the boss 5 aligns with the plane of the bottom face of the switchable magnetic device 1. This allows the operator to position the switchable magnetic device 1 on a first work piece 13, whose edge is lower than the second work piece 12. Then the flat surface of the boss 5 partially covers the face of the second work piece 12. When the handle 4 is pushed toward the first work piece 13, the second work piece 12 is lowered until the flat surface of the second end of the boss 5 contacts the top surface near the edge of the first work piece 13. In such an orientation, the top surfaces of the two work pieces are aligned and held in place by the flat surface of the boss 5. In this embodiment the present invention provides a quick and easy means for aligning and creating a butt-joint between two work pieces.

In additional embodiments of the present invention, the second end of the boss 5 can have alternative shapes. For example, the surface of the second edge of the boss 5 can be an arch so that the contact area between the boss 5 and the surface of a work piece approximates a line. Alternatively, the shape of the surface of the second end of the boss 5 can be spherical such that the contact area between the boss 5 and the surface of a work piece approximates a point. In this way, the shape of the second end of the boss can be shaped to provide the desired type of contact between the boss and the work piece.

In additional embodiments of the present invention and as illustrated in the figures, the handle 4 can be reinforced and strengthened by the use of a support 7 affixed to the handle 4 on the surface opposite the boss 5. The support 7 adds strength to the handle 4 to allow it to transmit a greater pushing force with a lesser risk of breaking the handle 4. While this is not necessary for every embodiment of the invention, such a support 7 can prove advantageous to some embodiments of the invention.

Another embodiment of in the present invention includes a guard 6. In such an embodiment, the guard 6 is attached to the first end of the handle 4. The guard 6 extends from the handle 4 in the same direction as the boss 5. The guard 6 protects an operators hand from being pinched between the handle 4 and the work piece should the switchable magnetic device 1 break loose from its work piece, should the work piece suddenly and unexpectedly give way, or should any other unexpected event cause the handle 4 to move suddenly and unexpectedly into contact with the work piece. In this embodiment of the present invention, the guard 6 would stop the movement of the handle 4 before the handle 4 trapped and pinched the operator's hand. Such a guard 6 is not necessary for every embodiment of the invention, but can prove advantageous on some embodiments.

What is claimed is:

1. An apparatus for applying a force on a workpiece, comprising:
    an elongated handle having a first end and a second end;
    a fork comprising a base and two support arms extending from the base, wherein the base of the fork is attached to the first end of the elongated handle and the two support arms extend away from the elongated handle; and
    a switchable magnet at least partially disposed between the two support arms.

2. The apparatus of claim 1, further comprising at least one fulcrum member disposed on the apparatus between the switchable magnet and the second end of the elongated handle.

3. The apparatus of claim 1, further comprising at least one fulcrum member rotatably disposed on the apparatus between the switchable magnet and the second end of the elongated handle, wherein the at least one fulcrum member has an arc-shaped contact surface.

4. The apparatus of claim 1, further comprising at least one fulcrum member rotatably disposed on the apparatus between the switchable magnet and the second end of the elongated handle, wherein the at least one fulcrum member has a flat contact surface.

5. The apparatus of claim 1, wherein the switchable magnet is rotatably disposed between the two support arms.

6. The apparatus of claim 1, further comprising at least one fulcrum member at least partially disposed on the fork, wherein the switchable magnet is rotatably disposed between the two support arms.

7. The apparatus of claim 6, wherein the at least one fulcrum member is rotatable with respect to the elongated handle.

8. The apparatus of claim 1, wherein the switchable magnet includes a contact side that is switchable between a non-magnetized state and a magnetized state, and wherein the contact side of the switchable magnet is configured to attach the apparatus to a workpiece when in the magnetized state.

9. An apparatus for applying a force on a workpiece, comprising:
a body comprising an elongated handle, a fork, and at least one fulcrum member; and
at least one switchable magnet disposed on the body, wherein the switchable magnet has a contact side that is switchable between a non-magnetized state and a magnetized state.

10. The apparatus of claim 9, wherein the fork comprises a spine and two prongs extending from the spine and parallel with respect to one another.

11. The apparatus of claim 10, wherein the at least one fulcrum member is at least partially disposed on the spine.

12. The apparatus of claim 10, wherein the at least one switchable magnet is rotatably disposed between the two prongs of the fork.

13. The apparatus of claim 9, wherein the at least one fulcrum member extends laterally from the body.

14. The apparatus of claim 9, wherein the at least one fulcrum member is adjacent the at least one switchable magnet.

15. The apparatus of claim 9, wherein the at least one fulcrum member is proximate the at least one switchable magnet.

16. The apparatus of claim 9, wherein the at least one fulcrum member is disposed on the elongated handle.

17. An apparatus for applying a force on a workpiece, comprising:
an elongated handle having a first end and a second end;
at least one switchable magnet disposed adjacent the first end of the elongated handle; and
at least one fulcrum member disposed adjacent the at least one switchable magnet, wherein the at least one fulcrum member is adapted to contact a workpiece.

18. The apparatus of claim 17, wherein the at least one fulcrum member has a flat contact surface and is rotatably disposed adjacent the at least one switchable magnet.

19. The apparatus of claim 17, wherein the at least one fulcrum member has an arc-shaped contact surface and is rotatably disposed adjacent the at least one switchable magnet.

20. The apparatus of claim 17, wherein the at least one fulcrum member is disposed on the elongated handle between the at least one switchable magnet and the second end of the elongated handle.

21. The apparatus of claim 1, wherein the switchable magnet comprises a housing, at least two permanent magnets disposed within the housing, and a switch extending from the housing for causing relative rotation of the permanent magnets.

22. The apparatus of claim 9, wherein the at least one switchable magnet comprises a housing, at least two permanent magnets, and a switch extending from the housing for causing relative rotation of the at least two permanent magnets.

23. The apparatus of claim 17, wherein the at least one switchable magnet comprises a housing, at least two permanent magnets disposed within the housing, and a switch extending from the housing for causing relative rotation of the at least two permanent magnets.

* * * * *